(12) United States Patent
Milliken (10) Patent No.: US 6,977,584 B2
(45) Date of Patent: Dec. 20, 2005

(54) VEHICLE BACK UP ALARM WITH ASSOCIATED BACK UP LIGHT

(76) Inventor: Franklin L. Milliken, 1154 Everett Ct., Concord, CA (US) 94518

( * ) Notice: Subject to any disclaimer, the term of this patent is extended or adjusted under 35 U.S.C. 154(b) by 107 days.

(21) Appl. No.: 10/654,304

(22) Filed: Sep. 2, 2003

(65) Prior Publication Data

US 2004/0046653 A1 Mar. 11, 2004

Related U.S. Application Data

(63) Continuation-in-part of application No. 09/796,499, filed on Feb. 28, 2001, now abandoned.

(60) Provisional application No. 60/185,279, filed on Feb. 28, 2000.

(51) Int. Cl.[7] .................................................. B60Q 1/26

(52) U.S. Cl. ....................... 340/468; 340/431; 340/435; 340/463; 340/471; 340/436; 340/474; 280/DIG. 14; 348/148

(58) Field of Search ............................. 340/425.5, 431, 340/435, 463, 468, 471, 436, 438, 474; 180/167, 180/169; 280/477, DIG. 14; 348/135, 148, 348/149

(56) References Cited

U.S. PATENT DOCUMENTS

| 4,851,813 | A | 7/1989 | Gottlieb ...................... 340/474 |
|---|---|---|---|
| 4,885,567 | A | 12/1989 | Katz ........................... 340/463 |
| 4,903,007 | A | 2/1990 | Gottlieb ...................... 340/474 |
| 4,994,800 | A | 2/1991 | Milliken ..................... 340/901 |
| 5,047,747 | A | 9/1991 | Gottlieb ...................... 340/463 |
| 5,885,567 | A | 3/1999 | Sekellick et al. .......... 424/85.4 |
| 6,166,623 | A | 12/2000 | Coward ................... 340/384.1 |
| 6,222,457 | B1 * | 4/2001 | Mills et al. .............. 340/686.1 |
| 6,400,308 | B1 * | 6/2002 | Bell et al. ...................... 342/71 |
| 2002/0003378 | A1 * | 1/2002 | Marcus et al. ............. 307/10.1 |

* cited by examiner

*Primary Examiner*—Julie Bichngoc Lieu
(74) *Attorney, Agent, or Firm*—LaRiviere, Grubman & Payne, LLP (57) ABSTRACT

A vehicle-in-motion warning apparatus having one or more warning device and a light source in a housing. The warning device may be an audible, visual, or objecting-sensing device, and is mounted behind a grill which is integrally formed with the housing face. The light source is mounted in front of the housing face and covered with a removeable transparent cover. The housing may be either formed to fit a vehicle recess or alternatively formed to fit into a trailer hitch receiver. The associated wiring harness is terminated with a standard connector which allows the apparatus to be plugged into the existing vehicle wiring harness without modification, or a pigtail for splicing into the wiring harness.

20 Claims, 6 Drawing Sheets

VEHICLE BACK UP ALARM WITH ASSOCIATED BACK UP LIGHT

CROSS-REFERENCE TO RELATED APPLICATION

This Continuation in Part application is related to, and claims priority from, non-provisional patent application Ser. No. 09/796,499 filed Feb. 28, 2001, now abandoned, which is related to and claims priority from, U.S. Provisional Application for Patent Ser. No. 60/185,279, filed Feb. 28, 2000, entitled "Vehicle Back Up Alarm with Integral Back Up Light."

TECHNICAL FIELD OF THE INVENTION

The present invention pertains generally to vehicle operating alarms and lights, and more specifically, to alarms which automatically operate to provide audible warning that a vehicle is in motion, especially when moving rearward to its normal direction of travel.

BACKGROUND ART

Back-up alarms are required on construction vehicles by the U.S. Occupational Safety and Health Administration (OSHA), on mining vehicles by the U.S. Mine Safety and Health Administration (MSHA) and on ambulances generally by Federal Contract "K" specifications. A number of states require back-up alarms on commercial vehicles. California (MVC 27,000) and Illinois require back-up alarms on garbage trucks. New York and Ohio require back-up alarms on school busses. Hawaii requires back-up alarms for delivery (e.g. UPS/FedEx) vehicles. Title 49 Code of Federal Regulations requires back-up lights on most classifications of over the highway trucks. Such alarms must meet published standards for sound emission levels. Back up alarms acceptable under the regulations are manufactured to meet the Society of Automotive Engineers standard, SAE J994b, for sound emission levels, among other requirements.

Back-up alarms are commonly attached to a motor vehicle by bolting the alarms to the frame or other body member in a rearward facing position. Back-up lights are normally installed as an integral part of the vehicle body or bumper. The inventor's prior invention, U.S. Pat. No. 4,994,800, is an exception as the alarms can now be mounted in a standard hole at the rear of the vehicle.

All major truck lighting manufacturers build many models of back-up lights that are attached to the vehicle by way of screws, bolts or, as in the TruckLite Model 40, within a rubber grommet of the same kind that can be used to attach a back-up alarm covered under U.S. Pat. No. 4,994,800. Light sources are commonly protected from damage and dirt by transparent covers, which are frequently unsuitable for covering alarm devices due to sound absorption and distortion properties of the cover.

Back up alarms and lights receive power from a common source and are activated simultaneously. It would be most practical if they were collocated because there frequently are restrictions on space and suitable mounting points available at the rear of commercial vehicles. To meet this need, the present invention provides a single-unit warning and lighting device that can be efficiently manufactured and installed as a replacement for an existing light or alarm on a vehicle without requiring any structural modification of the vehicle.

Further, most pickup trucks and sport utility vehicles come factory equipped with a trailer hitch receiver, which consists of a permanently mounted socket, typically square, into which a trailer hitch apparatus may be inserted when desired for use, and removed when not needed. Although many of these vehicles are sold for commercial use, many are family vehicles. Most of the vehicles are used without a trailer hitch a good part of the time. Although back-up alarms may not be required for these vehicles, it would be desirable to install an alarm, without drilling holes or otherwise modifying the vehicle, by using the hitch receiver. It would also be desirable, for example, to install an additional tail light, stop light, back-up light or other device in the hitch receiver. An embodiment of the present invention provides a vehicle-in-motion warning alarm or/and light that fits without modification into the trailer hitch receiver.

BRIEF DISClOSURE OF THE INVENTION

The present invention relates generally to a vehicle-in-motion warning system, which may comprise a warning device (e.g., a back-up alarm) in combination with a light (e.g., a vehicle back-up light.) The warning device may be either an audible signal generating mechanism, a light, or an object sensing device such as a radar or television, either alone or in combination. The present invention may take any of several embodiments: a housing containing an alarm and a light source, a housing containing an alarm or warning device and a sensor, a housing containing a sensor and light, a housing containing only one of the above devices, or a housing containing any combination of such devices. For example, the warning system may comprise a light adapted to be used with an existing vehicle alarm. A preferred embodiment comprises a housing containing an audible alarm which may be selected to meet published standards, and a light source to provide area illumination. Other embodiments may comprise any combination of two or more of: an audible warning device, distance-sensing device, warning lights, video and/or audio systems, communication systems or other devices, lighting device, and a standard housing to contain them and mount to a vehicle without modification of either the device or the vehicle. Such mounting is contemplated to be in a vehicle's receptacle for a back up alarm or light, or a trailer hitch receiver.

A first embodiment is a housing which is sized to match the standard mounting recesses of a vehicle such as an earth mover, commercial van or truck, or an emergency vehicle. The housing includes mounting means such as grommets, or flanges with holes, which may be designed to match either a specific vehicle or a variety of vehicles. Mounted within the housing is an audible alarm source and a light source to provide area illumination, which are typically wired to operate together. The audible alarm source and/or light source may be selected to meet regulatory requirements where desirable or necessary. The associated wiring harness is preferably terminated with a standard connector which allows the invention to be plugged into the existing vehicle wiring harness without modification. Alternatively, the wiring may be left unterminated and suitable for splicing into the vehicle wiring harness.

BRIEF DESCRIPTION OF DRAWINGS

For fuller understanding of the present invention, reference is made to the accompanying drawing in the following detailed description of the Detailed Description of the Invention. Reference numbers refer to the same or equivalent parts of the present invention throughout the several figures of the drawing. In the drawing.

DETAILED DESCRIPTION OF THE INVENTION

The present invention can take any of several embodiments: a housing containing an alarm, a housing containing an alarm and having an associated light source affixed, a housing containing an alarm or warning device and another sensor, a housing containing a sensor and light, or an alarm with two or more additional devices as identified below. Included in the first combination is an alternative of a light adapted to be used with an existing vehicle alarm. The preferred embodiment is a housing which is sized to match the standard 4.5 inch (11.44 centimeters) mounting recesses of a vehicle such as an earth mover, commercial van or truck, or an emergency vehicle, and having a combination of warning device and area lighting device. The housing includes a mid-section with a mounting aid such as an enlargement or ridge which cooperates with a resilient grommet, or flanges with holes therein which are designed to match either a specific vehicle or a variety of vehicles. The associated wiring harness for connection to the vehicle electrical system is preferably terminated with a standard connector which allows the invention to be plugged into the existing vehicle wiring harness without modification. Alternatively, the wiring may be left as an unterminated pigtail suitable for splicing into the vehicle wiring harness.

Referring to FIGS. 5–8, a preferred housing 9 for the present invention is shown. The housing 9 is open to the rear and includes a front face 11. Grill 1 is formed of regularly spaced slots in front face 11 and serves to allow sound from a warning device behind the grill to pass out of the apparatus. Apertures 8 also in the front face 11 provide for the passage of outside sounds to a sound-detecting device, e.g., a microphone, if installed in the apparatus. The housing 9 further defines a mid-section 22 extending away from the front face 11, which mid section 22 defines a ridge-like circumferential enlargement 16. The enlargement 16 is adapted to cooperate with a resilient grommet 12 (see FIG. 1B) to secure the apparatus within a vehicle recess. Light reflector halves 14A and 14B (collectively reflector 14) reside essentially in the plane of the front face 11. Reflector 14 may also function as a heat sink as desired. Electrically non-conductive divider 20 may be placed between halves 14A and 14B as desired.

Figure 1A:
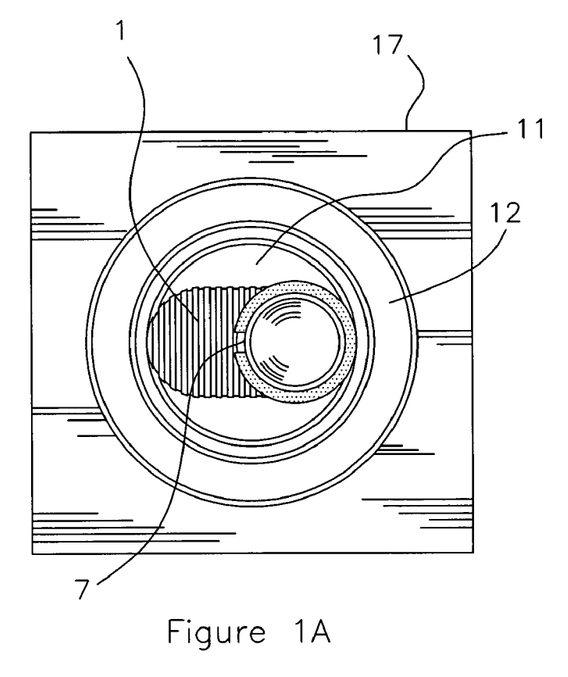
FIG. 1 shows three views of a preferred embodiment of the present invention.
Figure 1B:
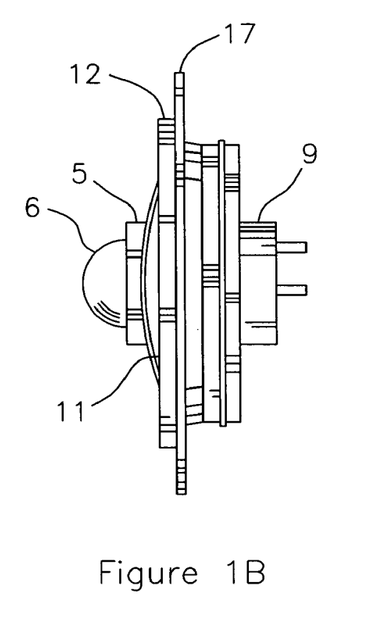
Figure 1C:
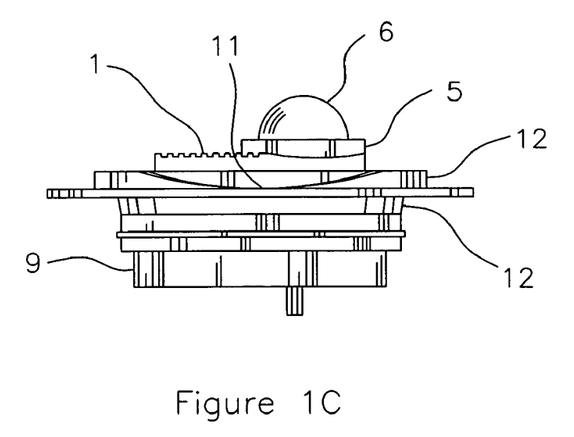

Referring now to FIGS. 1A, 1B, and 1C, three views and a cross section of a first embodiment of the present invention are shown. FIG. 1A is a frontal view, and in reference to FIG. 1A, FIG. 1B is a right edge-on view and FIG. 1C is a bottom edge-on view. Housing 9 is shaped to fit into a standard vehicle light or alarm receptacle by aid of resilient grommet 12. Housing 9 may be either round, as shown, oval, rectangular, or essentially any required shape suitable for the desired application. FIGS. 1 also shows vehicle surface 17 which represents the vehicle body which contains the light or alarm recess into which the present invention is fitted. Mounting grommet 12 provides a removable but secure way of easily attaching the invention to a vehicle.

Figure 2A:
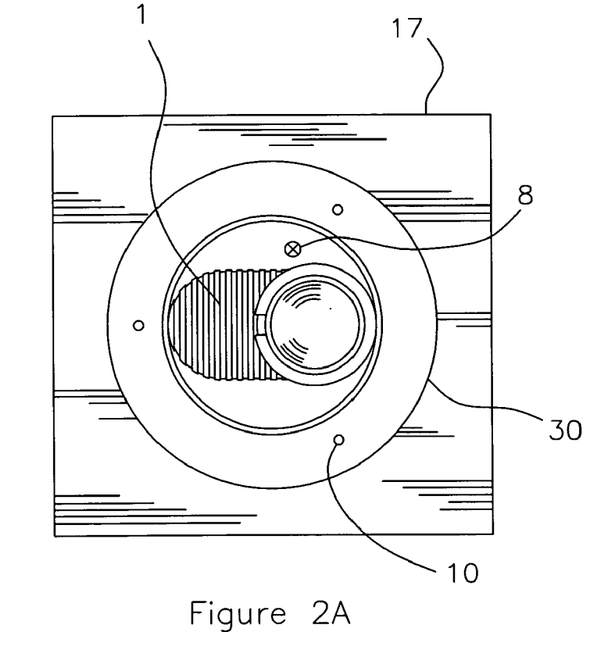
FIG. 2 shows three views of a second embodiment of the present invention.
Figure 2B:
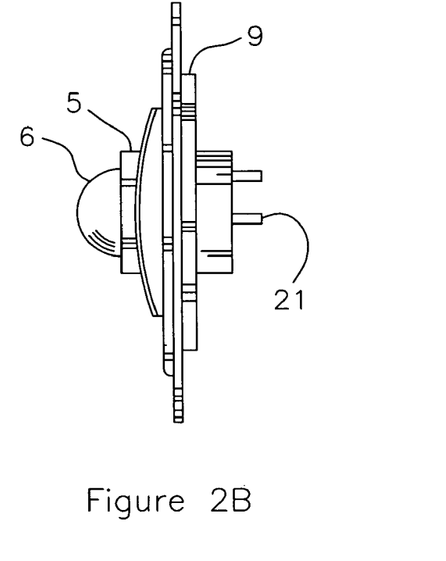
Figure 2C:
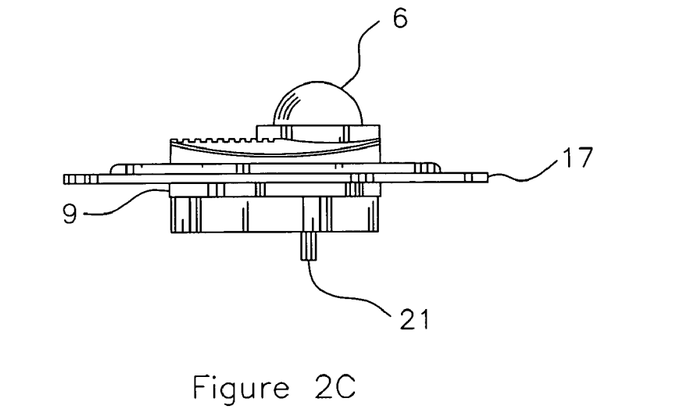

Referring now to FIGS. 2A. 2B, and 2C, a second embodiment of a housing and mounting of the present invention is shown. FIG. 2A shows a frontal view, FIG. 2B shows a right edge-on view, and FIG. 2C shows a lower edge-on view. Housing 9 in this embodiment is adapted to be affixed within the appropriate vehicle recess by fasteners passing through mounting holes 10 in flange 30, which fasteners may cooperate with vehicle surface 17 to mechanically attach housing 9 within a light or alarm recess in the vehicle surface 17. Housing 9 (in any embodiment), may further include aperture 8 for use with a sound detecting device such as a microphone.

Figure 3:
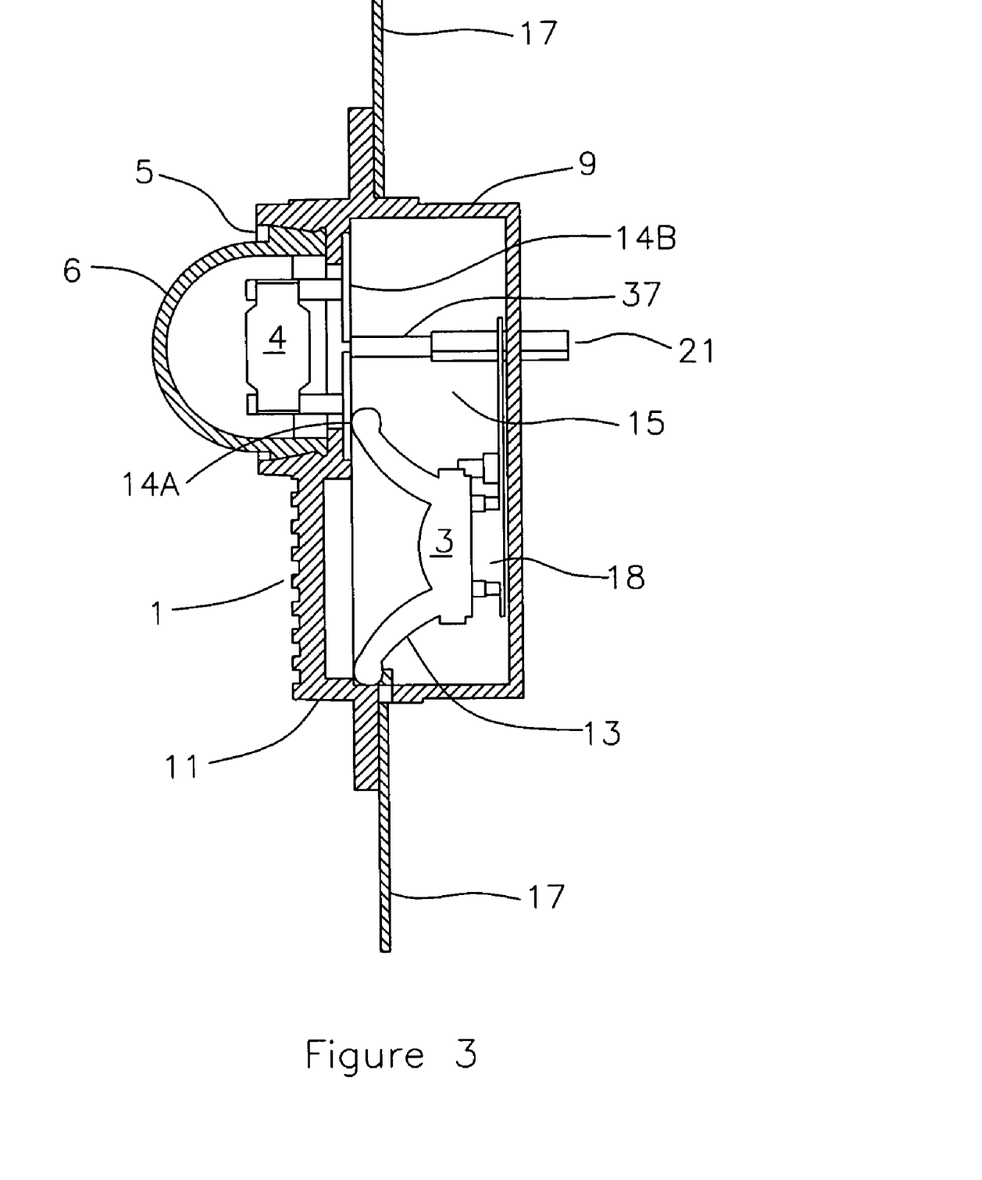
FIG. 3 shows a sectional view of the embodiments of FIGS. 1 and 2.

Internal components of the embodiments of FIGS. 1 and 2 are shown in FIG. 3. Flange 30 cooperates to connect the second embodiment with surface 17, while the other components apply equally well to the embodiments described in FIGS. 1 and 2. Housing 9 contains a warning device 3 substantially behind grill 1 (i.e., all of warning device 3 may not be behind grill 1) which is formed in front face 11. Warning device 3 may be one or more, used in combination, of any type of warning device such as an audibly warning device, a visually warning device, a device for sensing an object, and a televising device, and is preferably an audible warning device meeting SAE Standard J994b. Audible warning devices are commonly used as back up alarms. Placed upon a portion of and connected with housing 9 is light source 4. Reflector 14 separates light source 4 from warning device 3, forming a cavity 15 within which warning device 3 is mounted. If desired, cavity 15 may be filled with a water resistant material, commonly known as "potting compound".

Light source 4 may consist of a conventional incandescent lamp, or a brighter light source such as a strobe light, halogen lights or perhaps light emitting diodes; preferably a commonly available, long-life incandescent lamp. Light source 4 is mounted in front of reflector 14 which is mounted essentially in the plane of front face 11. Light source 4 is covered by a substantially transparent cover 6 which is detachably connected with front face 11 by attachment 5. If light source 4 is a long-life source such as a light emitting diode, transparent cover 6 may be fixedly connected rather than detachably connected with face 11. The forward placement of light source 4 and cover 6 allows an essentially hemispherical light distribution pattern to provide area illumination. Although the forward position of light source 4 is preferred, an apparatus with a light source within the housing 9 is intended to come within the scope of the present invention.

Attachment 5 is preferably a compression-fit ring providing a snap-in fit and appropriately sized to cooperate with and hold transparent cover 6, but alternatively may be a snap-ring retainer, a circumferentially threaded recess that cooperates with circumferential threads on transparent cover 6, or a washer-like retainer that cooperates with transparent cover 6 and is attached to face 11 with threaded fasteners. In the preferred embodiment, attachment 5 is a compression-fit ring having a release 7 slot which allows access by a tool such as a flat screw driver to pry transparent cover 6 out of attachment 5 as needed for maintenance. For example, removal of the transparent cover 6 allows replacement of the light source 4.

As shown in FIG. 3, a typical warning device 3 is made in the manner of an audio speaker or driver with a speaker cone 13 which serves to amplify the sound generated by an electronic printed circuit board and associated electronics 18. Reflector 14 is a metal or light-reflective composite member which forms a chamber 15 in conjunction with housing 9, separating the warning device 3 from the associated light source 4. Chamber 15 may be filled with potting compound if desired. Electrical connection 21 may connect to the vehicle wiring harness and ground as appropriate. Electrical connection 21 may comprise wires either terminated in a plug suitable for the vehicle wiring harness or left unterminated, suitable for splicing into the vehicle wiring. Wires 37 may electrically connect electrical connection 21 to reflector halves 14A and 14B, which reflector halves 14A and 14B may be electrically connected to light source 4.

Figure 4:
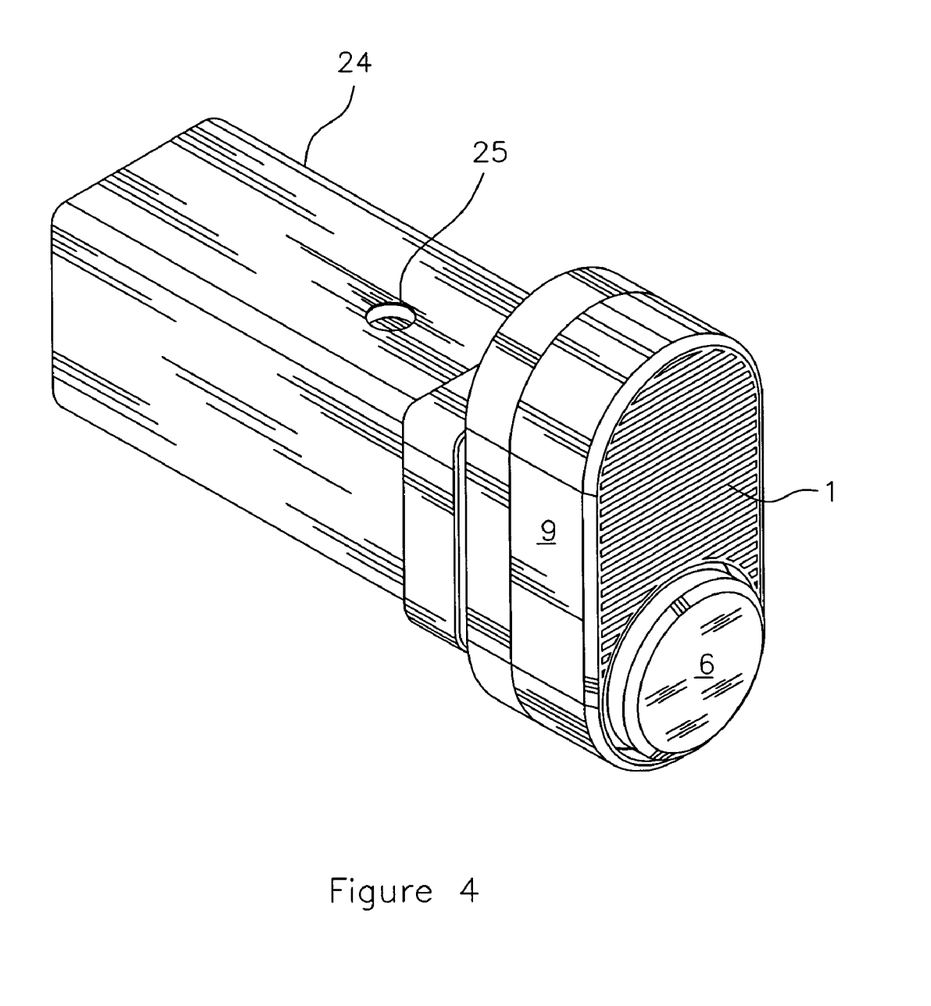
FIG. 4 shows an embodiment adapted for use with a trailer hitch receiver.
Figure 5:
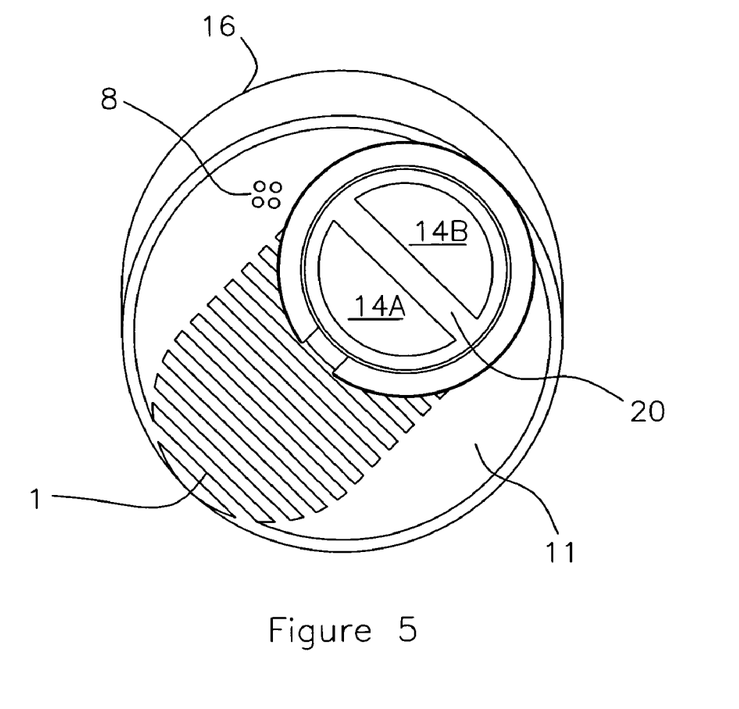
FIG. 5 is a perspective front view of the housing for the embodiment of FIG. 1.
Figure 6:
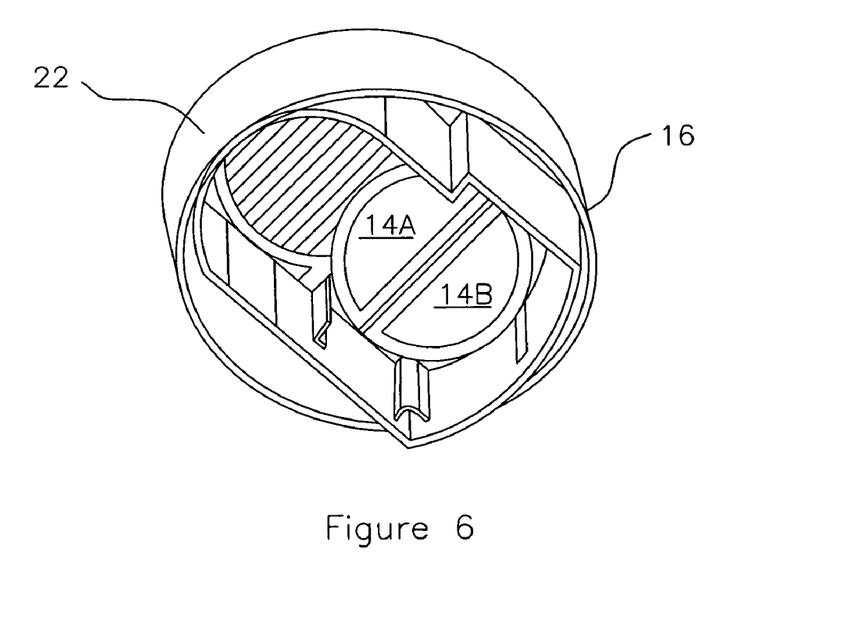
FIG. 6 is a perspective rear view of the housing for the embodiment of FIG. 5.
Figure 7:
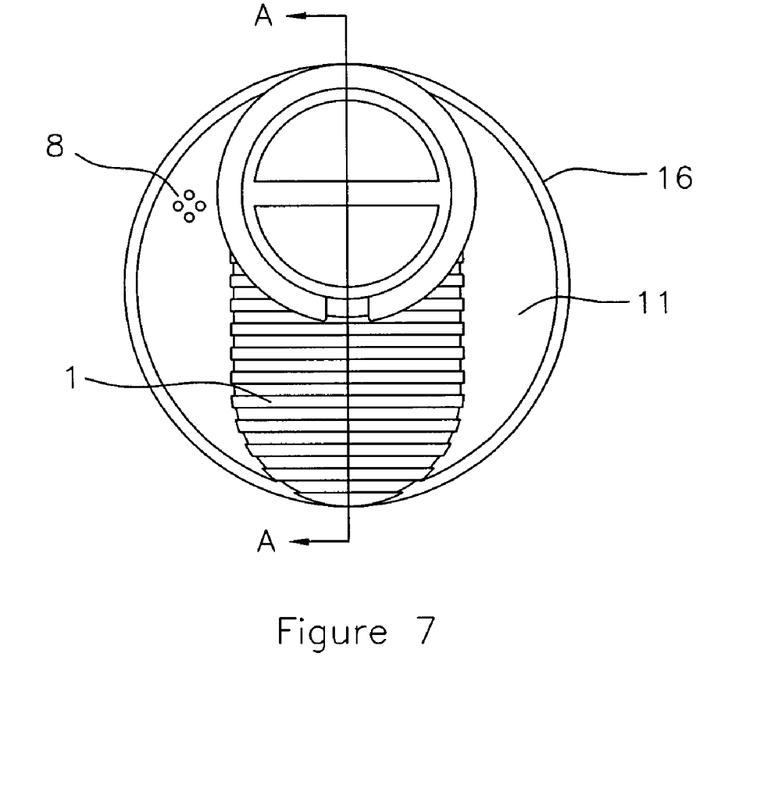
FIG. 7 is a front face view of the housing of FIG. 5.
Figure 8:
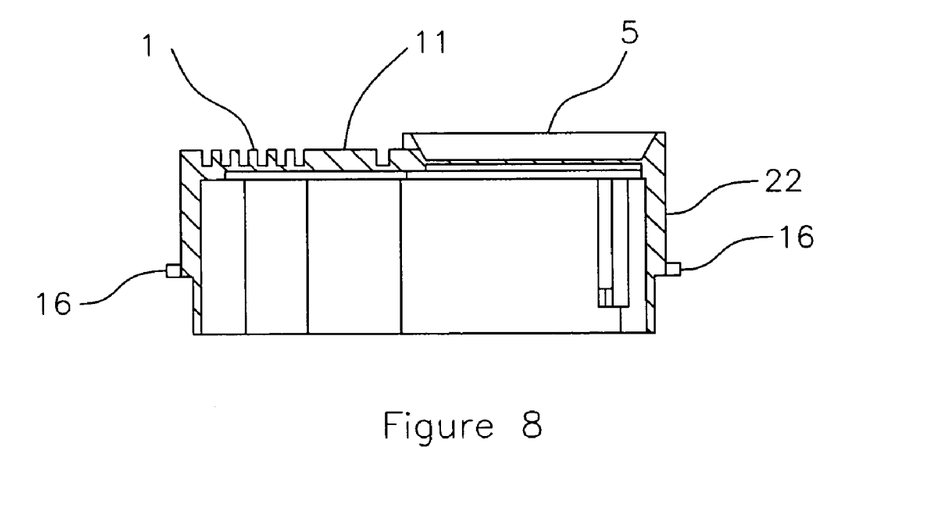
FIG. 8 is a sectional view of the housing of FIG. 7.

An alternative housing form shown in FIG. 4 is similar to the preferred housing 9 with the addition of a rear-ward extending hitch mount 24 adapted to fit into either a two inch or one and one-half inch standard vehicle trailer hitch receiver, with either an included means for securing the housing to the receiver or a separate locking device. Mounted within the housing is a warning device such as an audible alarm source, a light source alone, or a warning device and a light source which are wired to operate together, as shown in FIG. 3 above. The associated wiring harness is preferably terminated with a standard connector which allows the invention to be plugged into the existing vehicle wiring harness or trailer electrical connector without modification. In this embodiment, light source 4 could be a stop light, a back up light, or a combination of both.

Continuing with FIG. 4, mount 24 further contains securing hole 25 in a position and size compatible with the industry standard. While shown relative to one surface of mount 24, hole 25 may alternatively be provided in a direction orthogonal to the direction shown. While a combination of warning device 3 and light source 4 is shown, it is to be understood that either the warning device 3 or the light source 4 could be removed, replaced with a different device, or augmented with an additional device or devices as discussed supra.

In yet another embodiment of the invention, light source 4, or warning device 3, may be replaced or augmented with a sensor. The type of sensor is limited only by current technology. For example, a television camera, an audio detector such as a microphone or other sound-sensing device, a visual warning generator, or an object sensing device may be used. A small sound-sensor and associated speaker could be employed, allowing the vehicle operator to both listen for persons or activities behind or near the vehicle, as well as to either manually or automatically broadcast an audible warning. Current technology allows for miniaturized televison cameras, perhaps fitted with a wide-angle lens, that can be fitted into a suitable housing. Such a camera would be associated with a television monitor at the vehicle operator's station, providing an enhanced view of the area behind or near the vehicle. Other technologies for sensing devices useful for warning the operator of someone behind or near the vehicle include, but are not limited to, proximity radar, Doppler radar, sonar, ultra sound ranging, ultraviolet or infrared sensors and microwave sensors for example. In this embodiment, warning device 3 could also be replaced with or augmented by some other alarming device.

Forms of suitable warning devices other than audible alarms include, for example, visual warning devices consisting of incandescent lights, perhaps colored red, blue or yellow; strobe lights; halogen lights; and light emitting diodes. These visual warning devices could be made to provide either a fixed or steady light such as a stop light, or a flashing warning. Essentially many types of warning devices may be used in the present apparatus.

In another embodiment of the invention, an alarm may be replaced with a sensor and used in conjunction with light source 4. The technologies contemplated for both sensor and lights are described above. Further, it is understood that, while the present invention has been described in terms of a vehicle backing-up system, it is readily adaptable for forward motion or other movements of many forms of vehicles, machinery or equipment (collectively "equipment"), as well as other warning requirements such as raising or lowering of dump truck bodies, aerial or man lifts, garbage packers, movement of stabilizing outriggers, kneeling busses, deployment of handicap lifts, and the like.

It is also to be understood that the electrical power source to operate the devices associated with the invention is preferably the vehicle electrical system. Associated with the typical vehicle reverse gear is normally a switch that turns on power to the back up alarm or light receptacle when the reverse gear is engaged. This automatically provides power to the present invention. An additional power source from the vehicle electrical system may be provided through an operator-accessible switch or key-switch to power some or all of the invention combination as desired, whether or not the vehicle is in motion or the equipment engine is turned off. For example, a switch could be provided to power the audio speaker so that the operator could issue verbal directions to persons near the vehicle. Any and all such combinations of powering the individual devices described herein are contemplated by and included within the present invention.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more". All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, material, and fabrication detail may be made without departing from the spirit and scope of the inventions as set forth in the appended claims. No claim herein is to be construed under the provisions of 35 U.S.C. 112, sixth paragraph, unless the element is expressly recited using the phrase "means for".

What is claimed is:

1. A vehicle-in-motion warning apparatus comprising:
   a housing having a mid-section, the mid-section having an enlargement for attaching the apparatus to a vehicle by insertion into at least one pre-formed vehicle recess selected from a group consisting essentially of a light assembly recess and a warning device recess, the at least one recess being defined by at least one edge, and the housing being secured within the at least one recess by means for resiliently and cooperatively locking with the at least one edge and the enlargement;
   a warning device residing in the housing;
   a front face defined on the housing, the face defining a grill covering the warning device;
   a light source replaceably connected with the housing in front of the plane of the front face;
   a replaceably removable substantially transparent hemispherical cover over the light source, and
   means for electrically connecting the apparatus with a vehicle wiring harness.

2. An apparatus, as recited in claim 1, further including a reflector connected with the housing, the reflector residing essentially in the plane of the front face, wherein the light source is mounted in front of the reflector.

3. An apparatus, as recited in claim 1, wherein the warning device comprises at least one device selected from a group consisting of an audibly warning device, a visually warning device, a device for sensing an object, and a televising device.

4. An apparatus, as recited in claim 3, wherein the audibly warning device comprises at least one device selected from a group consisting of a sound generating electronic circuit, an audio detector, and a speaker.

5. An apparatus, as recited in claim 3, wherein the object sensing device comprises at least one device selected from a group consisting of a proximity radar device, a Doppler radar device, a sonar device, an ultrasound device, an ultraviolet sensor, an infrared sensor, and a microwave sensor.

6. An apparatus, as recited in claim 1, wherein the warning device is sealed into the housing by a water-resistant compound.

7. An apparatus, as recited in claim 1, wherein the replaceably removable cover is attached to the housing by a cover retaining means selected from a group consisting of a compression snap-in fitting, circumferential threads, a snap-ring retainer, and a retainer-plus-threaded fastener.

8. A vehicle-in-motion warning apparatus, comprising:
   a housing having a front face, the face defining a grill, wherein a light reflector is connected therein disposed in the plane of the front face the front face;
   a warning device residing in the housing, the warning device comprising at least one device selected from a group consisting of an audibly warning device, a visual warning device, an object sensing device, and a device for televising;
   a light source comprising at least one device selected from a group consisting of an incandescent lamp, a strobe light, a steady halogen lamp, and a light-emitting diode, wherein the light source is mounted in front of the reflector;
   a detachable reattachable substantially transparent cover over the light source;
   means for mounting and securing the apparatus to a vehicle trailer hitch receiver; and
   means for electrically connecting the apparatus to a vehicle electrical system.

9. An apparatus, as recited in claim 8, wherein the device for televising comprises a television camera being electrically connected with a television display, the television display being adapted for viewing by a vehicle operator.

10. An apparatus, as recited in claim 8, wherein the audibly warning means comprises at least one element selected from a group consisting essentially of a sound generating electronic circuit, an audio detector, and a speaker.

11. An apparatus, as recited in claim 8, wherein the retachably detachable cover is attached to the housing by a cover retaining mechanism selected from a group consisting of a compression snap-in fitting, circumferential threads, a snap-ring retainer, and a retainer-plus-threaded fastener.

12. An equipment-in-motion warning apparatus comprising:
   a housing having a front face, the face defining a grill:
   a warning device residing in the housing and covered by the grill;
   a light source comprising at least one element selected from a group consisting of an incandescent lamp, a strobe light, a steady halogen lamp, and a light-emitting diode,
   a reflector residing essentially in the plane of the front face, wherein the light source resides in front of the reflector;
   a replaceably removable substantially transparent cover over the light source and attached to the face by a mechanical attachment selected from a group consisting of a compression snap-in fitting, a circumferential threads, a snap-ring retainer, and a retainer-plus-threaded fastener; and
   means for electrically connecting the apparatus with the equipment.

13. An apparatus, as recited in claim 12, wherein the face includes an aperture for covering a sound detection means.

14. An apparatus, as recited in claim 12, wherein the warning means comprises at least one means selected from a group consisting essentially of means for audibly warning, means for visually warning, means for sensing an object, and means for televising.

15. An apparatus, as recited in claim 14, wherein the audibly warning means comprises at least one element selected from a group consisting essentially of a sound generating electronic circuit, an audio detector, and a speaker.

16. An apparatus, as recited in claim 14, wherein the object sensing means comprises at least one element selected from a group consisting essentially of a proximity radar device, a Doppler radar device, a sonar device, an ultrasound device, an ultraviolet sensor, an infrared sensor, and a microwave sensor.

17. An apparatus, as recited in claim 12, wherein the light source is a light-emitting diode and the replaceably removable cover is replaced by a fixed, non-removable cover.

18. An apparatus, as recited in claim 12, wherein the housing includes a mid-section, the mid-section having an enlargement for attaching the apparatus to a vehicle by insertion into at least one pre-formed vehicle recess selected from a group consisting essentially of a light assembly recess and an alarm assembly recess, the at least one recess being defined by at least one edge, and the housing being secured within the at least one recess by means for resiliently and cooperatively locking with the at least one edge and the enlargement.

19. An apparatus, as recited in claim 12, further including means for mounting and securing the apparatus to a vehicle trailer hitch receiver.

20. An apparatus, as recited in claim 12, wherein the means for electrically connecting the apparatus with a vehicle wiring harness comprises an electrical connector residing on the housing.

* * * * *

UNITED STATES PATENT AND TRADEMARK OFFICE
CERTIFICATE OF CORRECTION

PATENT NO.   : 6,977,584 B2
DATED        : December 20, 2005
INVENTOR(S)  : Franklin L. Milliken It is certified that error appears in the above-identified patent and that said Letters Patent is hereby corrected as shown below:

<u>Column 7,</u>
Line 51, after "the front face" delete "the front face".

Signed and Sealed this

Eighteenth Day of April, 2006

JON W. DUDAS
*Director of the United States Patent and Trademark Office*